(12) United States Patent
Baker et al.

(10) Patent No.: US 10,951,593 B2
(45) Date of Patent: Mar. 16, 2021

(54) PROGRAMMATIC CONTROL CHANNEL FOR AUTOMATED DATA DISTRIBUTION

(71) Applicant: VERIZON MEDIA INC., New York, NY (US)

(72) Inventors: Wendell Baker, Palo Alto, CA (US); Kristof Nagel, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 233 days.

(21) Appl. No.: 16/149,356

(22) Filed: Oct. 2, 2018

(65) Prior Publication Data

US 2020/0106750 A1  Apr. 2, 2020

(51) Int. Cl.
| | |
|---|---|
| G06F 16/26 | (2019.01) |
| H04L 29/06 | (2006.01) |
| G06F 21/62 | (2013.01) |
| G06F 16/9535 | (2019.01) |

(52) U.S. Cl.
CPC .......... *H04L 63/0428* (2013.01); *G06F 16/26* (2019.01); *G06F 16/9535* (2019.01); *G06F 21/6263* (2013.01)

(58) Field of Classification Search
CPC .. G06F 21/6218; G06F 21/6227; G06F 16/26; G06F 16/9535; G06F 21/6263; H04L 63/0428
See application file for complete search history.

*Primary Examiner* — Paul E Callahan
(74) *Attorney, Agent, or Firm* — James J. De Carlo; Greenberg Traurig, LLP

(57) ABSTRACT

Disclosed are apparatuses, systems, and methods for providing a programmatic control channel for granting or denying access to user data. In one embodiment, a method is disclosed comprising receiving an input stream of data including user data and a first regulatory control channel (RCC) data structure; building a final RCC data structure based on the first RCC data structure and a stored RCC data structure; retrieving a regulatory query context (RQC) from a data requestor; applying one or more Boolean operators to the final RCC data structure and the RQC to obtain an evaluation result; and executing the downstream processing if the evaluation result comprises a passing evaluation result.

20 Claims, 7 Drawing Sheets

PROGRAMMATIC CONTROL CHANNEL FOR AUTOMATED DATA DISTRIBUTION

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed to programmatic data distribution networks and, in particular, to a control channel architecture for programmatically allowing and denying access to data based on token matching and information labeling.

Personalization, or targeting, of digital content is a cornerstone of the modern Web and mobile applications. Users generally provide personal information to perform this personalization in exchange for access to services. Changes in industry (voluntary and involuntary) have increased focus on precisely how data processors and data controllers process this personal information. Most recently, the European Union has introduced regulations that place significant processing burdens on entities handling user information.

Existing systems for processing user information generally rely on complex and large data structures that formulate what can and cannot be done with user data. For example, many existing systems rely on parsing and storing consent details within cookies present on user devices. When user devices transmit cookies to a data processor, these cookies must be unpacked and parsed. Frequently, consent data in cookies is stored in a serialized format such as JavaScript Object Notation (JSON) which incurs significant processing penalties when applied on a massive scale. Specifically, the conversion of a serial bit stream into a structured JSON object incurs significant processing penalties by the device performing the parsing. These processing overheads are incurred on top of the complex logic applied to the parsed JSON consent data. In addition to the foregoing, existing systems rely on hard-coded algorithms to apply to the JSON-based consent data and must be manually modified to account for new data processing workflows and new entities requesting access to data.

Thus, there exists a need to improve existing consent management systems to reduce the processing power consumed by such systems.

SUMMARY

To remedy the above deficiencies, the disclosed embodiments describe systems, methods, and devices for programmatically granting or denying access to personal information using a light-weight control channel. The disclosed embodiments improve upon existing systems by eliminating the need for heavy data structures, relying exclusively on a short bit string encoding consent data. Further, the disclosed embodiments provide a new regulatory query context object that encapsulates data processor requests and is similarly lightweight. These objects are combined using quick Boolean operators that can provide a pass or fail result significantly faster than existing consent systems, thus improving the operation of the device(s) executing the consent processing algorithms.

In one embodiment, a method is disclosed comprising receiving an input stream of data, the data including user data and a first regulatory control channel (RCC) data structure; building a final RCC data structure based on the first RCC data structure and a stored RCC data structure, the final RCC data structure comprising a bit string represent user consent for processing the user data; retrieving a regulatory query context (RQC) from a data requestor, the RQC comprising a second bit string representing a type of downstream processing request of the data requestor; applying one or more Boolean operators to the final RCC data structure and the RQC to obtain an evaluation result, the Boolean operators being applied to individual bits of the bit string of the final RCC and second bit string of the RQC; and executing the downstream processing if the evaluation result comprises a passing evaluation result.

In another embodiment, an apparatus is disclosed comprising a processor; and a storage medium for tangibly storing thereon program logic for execution by the processor, the stored program logic comprising: logic, executed by the processor, for receiving an input stream of data, the data including user data and a first regulatory control channel (RCC) data structure; logic, executed by the processor, for building a final RCC data structure based on the first RCC data structure and a stored RCC data structure, the final RCC data structure comprising a bit string represent user consent for processing the user data; logic, executed by the processor, for retrieving a regulatory query context (RQC) from a data requestor, the RQC comprising a second bit string representing a type of downstream processing request of the data requestor; logic, executed by the processor, for applying one or more Boolean operators to the final RCC data structure and the RQC to obtain an evaluation result, the Boolean operators being applied to individual bits of the bit string of the final RCC and second bit string of the RQC; and logic, executed by the processor, for executing the downstream processing if the evaluation result comprises a passing evaluation result.

BRIEF DESCRIPTION OF THE DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Subject matter will now be described with reference to the accompanying drawings which show illustrative embodiments. Subject matter can, however, be embodied in a variety of different forms and the claimed subject matter is intended to be construed as not being limited to any example embodiments. Likewise, a reasonably broad scope for claimed or covered subject matter is intended. Among other things, subject matter can be embodied as methods, devices, components, or systems. Accordingly, embodiments can, for example, take the form of hardware, software, firmware or any combination thereof (other than software per se).

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to: a processor of a general purpose computer to alter its base functions as detailed herein; a special purpose computer; ASIC or other programmable data processing apparatus, such that the instructions when executed implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In general, terminology can be understood at least in part from usage in context. For example, terms, such as "and", "or", or "and/or," as used herein can include a variety of meanings that can depend at least in part upon the context in which such terms are used. Typically, "or," if used to associate a list, such as A, B or C, is intended to mean A, B, and C, here used in the inclusive sense, as well as A, B or C, here used in the exclusive sense. Also, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. Also, the term "based on" can be understood as not necessarily intended to convey an exclusive set of factors and can, instead, allow for the existence of additional factors not necessarily expressly described, again, depending at least in part on context.

Figure 1:
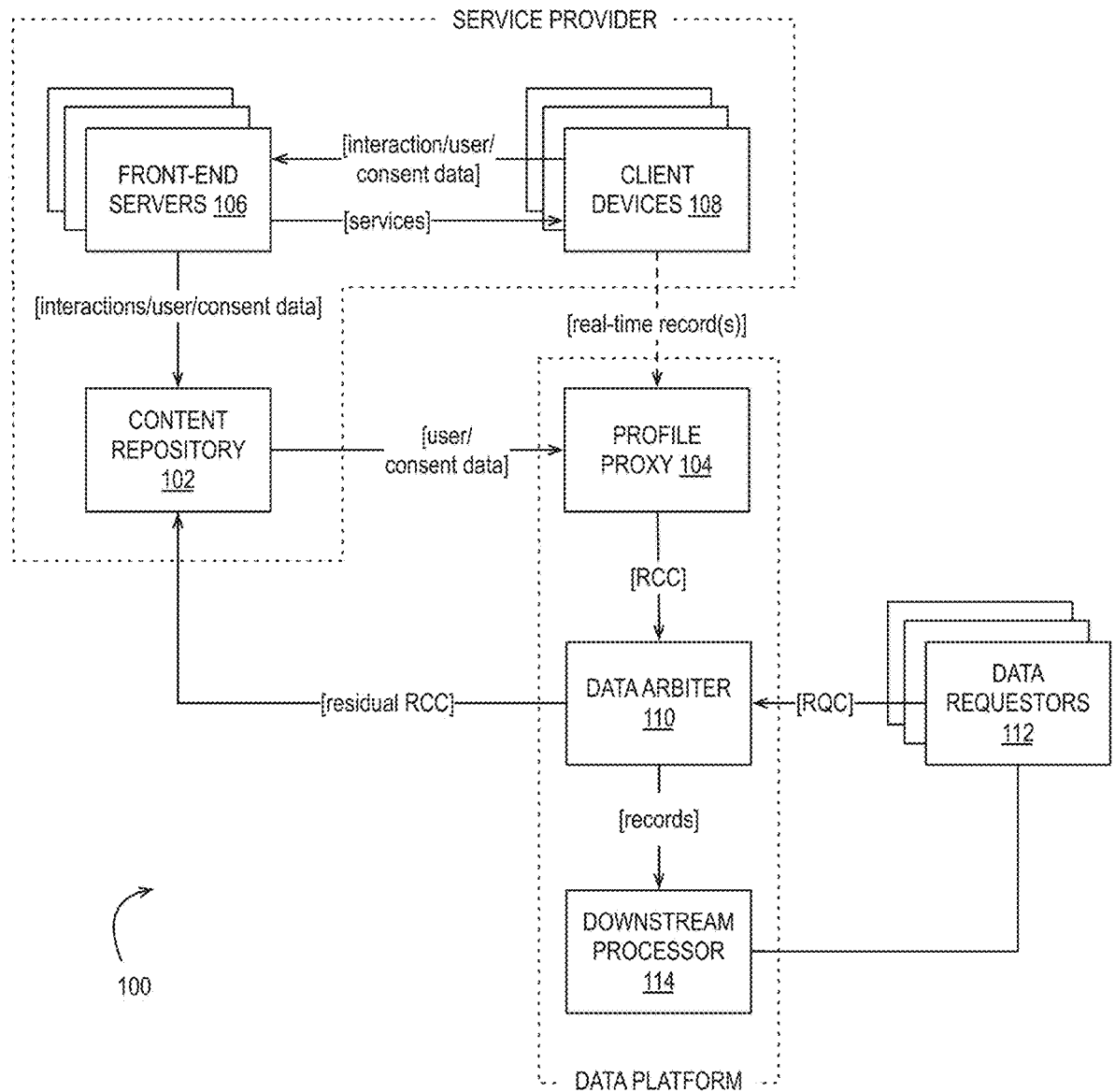
FIG. 1 illustrates a system for controlling access to user data according to some embodiments of the disclosure.

FIG. 1 illustrates a system for controlling access to user data according to some embodiments of the disclosure.

The system (100) includes a content repository (102). The content repository (102) comprises any type of storage device capable of storing data. Although illustrated as a single repository, the content repository (102) can include multiple physical devices, distributed geographically over any distance. For example, the content repository (102) can comprise a server farm or data center containing multiple storage devices (e.g., network-attached storage) as well as multiple application servers for managing the data. While the specification does not place a limit on the exact form of the content repository (102), the embodiments described below presume that the content repository (102) comprises a network-accessible data storage device or system capable of storing data associated with multiple users or devices. The content repository (102) can comprise a single, or set, of databases (e.g., relational databases), a data lake or big data repository, or combination thereof.

The content repository (102) can store any type of data, but in some embodiments, the content repository (102) explicitly stores user data and consent data. As used herein, user data refers to any information regarding users tracked by the content repository (102). User data can include demographic and biographical data (e.g., name, age, gender, etc.) but can also include other types of data such as interaction histories, purchase histories, etc. The specification does not limit the embodiments to a specific type of user data. Similarly, consent data can comprise any type of data indicative of a user's consent to share their user data. Consent data can comprise answers the users provide to a consent form or similar interface that collects user consent to share user data. Alternatively, or in conjunction with the foregoing, consent data can comprise a set of rules or permissions defined by the user regarding how a system shares their data.

In some embodiments, the system (100) maintains and controls the content repository (102). In other embodiments, a third party can own or control the content repository (102). In these embodiments, the system (100) accesses the content repository (102) via an application programming interface (1PI) or similar mechanism.

In the foregoing embodiment, the system (100) stores data in the content repository (102) based on user interactions with one or more front-end servers (106). The front-end servers (106) comprise any type of networked server configured to receive data from users and respond to users. Examples of front-end servers (106) include Apache, Express, and Internet Information Services (IIS) servers. The front-end servers (106) can provide services to client devices (108). Examples of services include websites, APIs for mobile applications, and generally any service providing data to users of client devices (108) in response to user requests.

As illustrated, front-end servers (106) provide services to client devices (108). As part of providing these services, client devices (108) transmit interactions and user data back to front-end servers (106). Interactions can comprise requests for content (e.g., HTTP requests) as well as finer grained detail such as the type of interaction (e.g., mouse click, hover, etc.). Client devices (108) can submit user data explicitly (e.g., through filling out forms such as profile forms) or implicitly (e.g., by expressing preferences for content by "liking" content, etc.). Front-end servers (106) provide services by accessing one or more databases as well as other content (not illustrated). Additionally, front-end servers (106) can parse and store user/interaction data in content repository (102).

Additionally, client devices (108) can transmit consent data to front-end servers (106). Consent data can comprise information regarding opt-in or opt-out preferences of a user for a given service or platform. For example, front-end servers (106) can provide a form allow a user to select their preferences for consenting to use of their data Front-end servers (106) store this consent data within content repository (102) in a manner similar to that described previously.

In short, client devices (108), front-end servers (106), and content repository (102) comprise a subsystem for providing network services, gathering personal user data, and recording a user's consent preferences for such data.

In the illustrated embodiment, the above subsystem may share user data with other services provided by the owner or operator of the system (100) or with third parties. As one example, one service provided by the front-end servers (106) can comprise a social network. These services record many types of user interactions and one such interaction comprises "liking" or favoriting content or posts. In some embodiments, the front-end servers supporting the social network can derive a profile for the user that represents the interests of a user. The system (100) can then use this profile information as a user's personal data for downstream processing (described in more detail below). In addition, the front-end server providing the social networking application can provide a "preferences" page (or portion of a mobile application) that allows a user to set preferences as to how their user data can be shared or otherwise utilized.

In one embodiment, the system (100) can perform all downstream processing of user data (i.e., "first-party" processing). Alternatively, the system (100) can provide the user data to third-parties for external processing (i.e., "third-party" processing). In either scenario, the system (100) employs additional hardware that forms a control channel for governing access to user data, either by the system (100) itself or by third parties.

Illustrated in FIG. 1, is a profile proxy (104) that controls access to user data stored in content repository (102). As illustrated, profile proxy (104) receives user data as well as consent data from the content repository (102) and performs functions on the user and consent data as described below). In some embodiments, the profile proxy comprises a set of servers dedicated to managing the flow of user data Alternatively, the profile proxy (104) can be implemented as part of another server device (e.g., front-end servers (106)).

As illustrated, in some embodiments, profile proxy (104) receives real-time records from client devices (108). In some embodiments, this data is optional. When implemented, the real-time records comprise user data associated with an action performed by the client device. For example, the real-time records can comprise user data associated with a bid request for an automated real-time bidding system. That is, the real-time record can comprise the user's identifier (ID), Internet Protocol (IP) address, location (e.g., latitude/longitude), jurisdiction (e.g., a regulatory scheme governing the user's action), data usage consent parameters, a publisher type (first-party or third-party), and various other data stored within a cookie or other local storage mechanism. The real-time record thus comprises a real-time regulatory control channel (RCC).

In the illustrated embodiment, profile proxy (104) "blends" the received real-time record user and consent data into a single RCC. As described above, the profile proxy (104) receives an input stream for a plurality of users containing records and RCCs for each user ($rcc_{each}$, $user_{each}$, $record_{each}$). The profile proxy (104) retrieves user data (e.g., a profile) and an RCC ($rcc_{stored}$) stored in content repository (102). The profile proxy (104) blends these two RCCs ($rcc_{stored}$ and $rcc_{each}$) to generate a combined RCC ($rcc_{final}$). In one embodiment, the combining operation compares each field of the RCCs ($rcc_{stored}$ and $rcc_{each}$). In one embodiment, an RCC comprises a multi-bit field, with each bit representing a user's consent preferences.

Figure 2A:
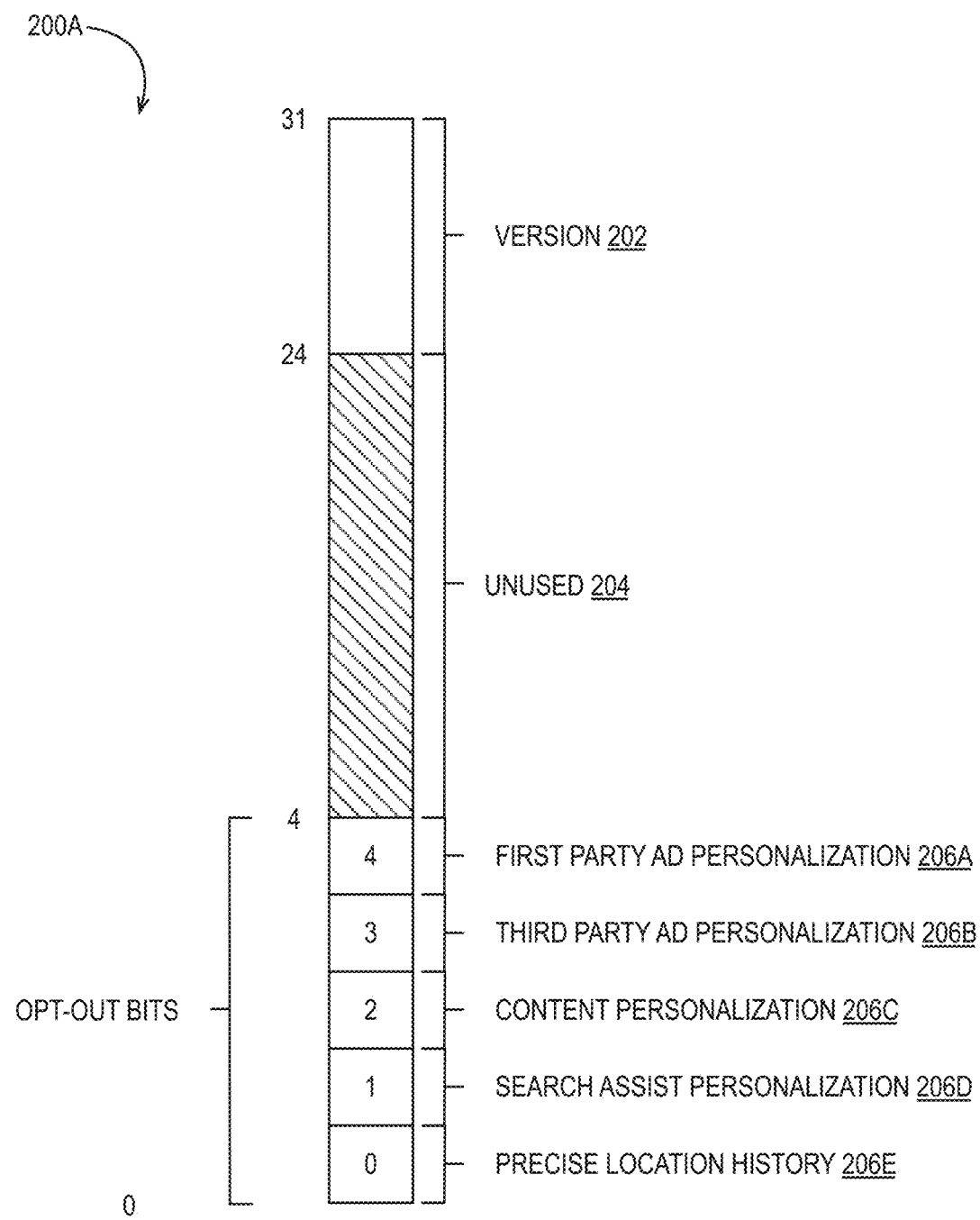
FIGS. 2A-2C are diagrams illustrating exemplary RCC field layouts according to some embodiments of the disclosure.
Figure 2B:
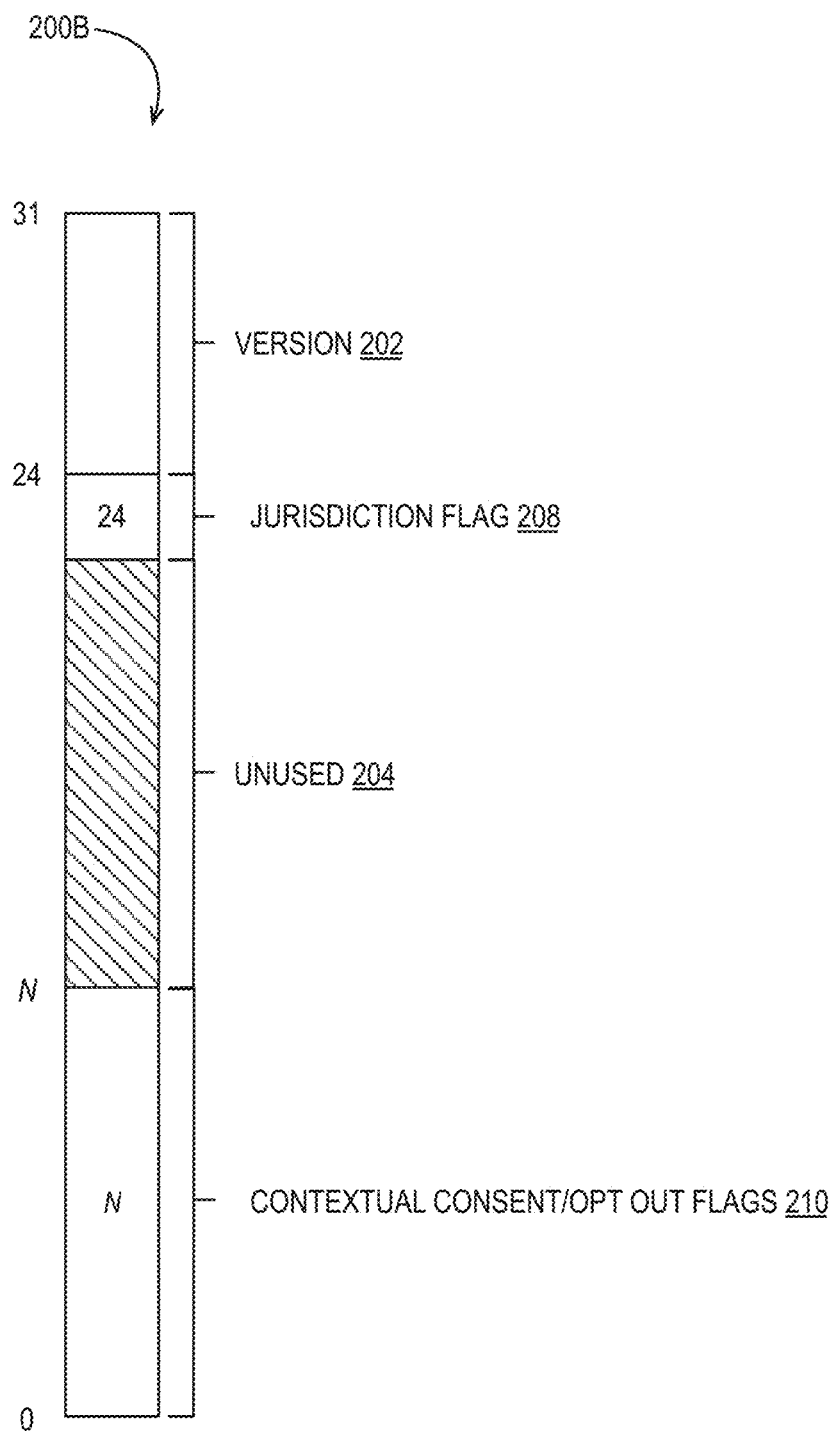
Figure 2C:
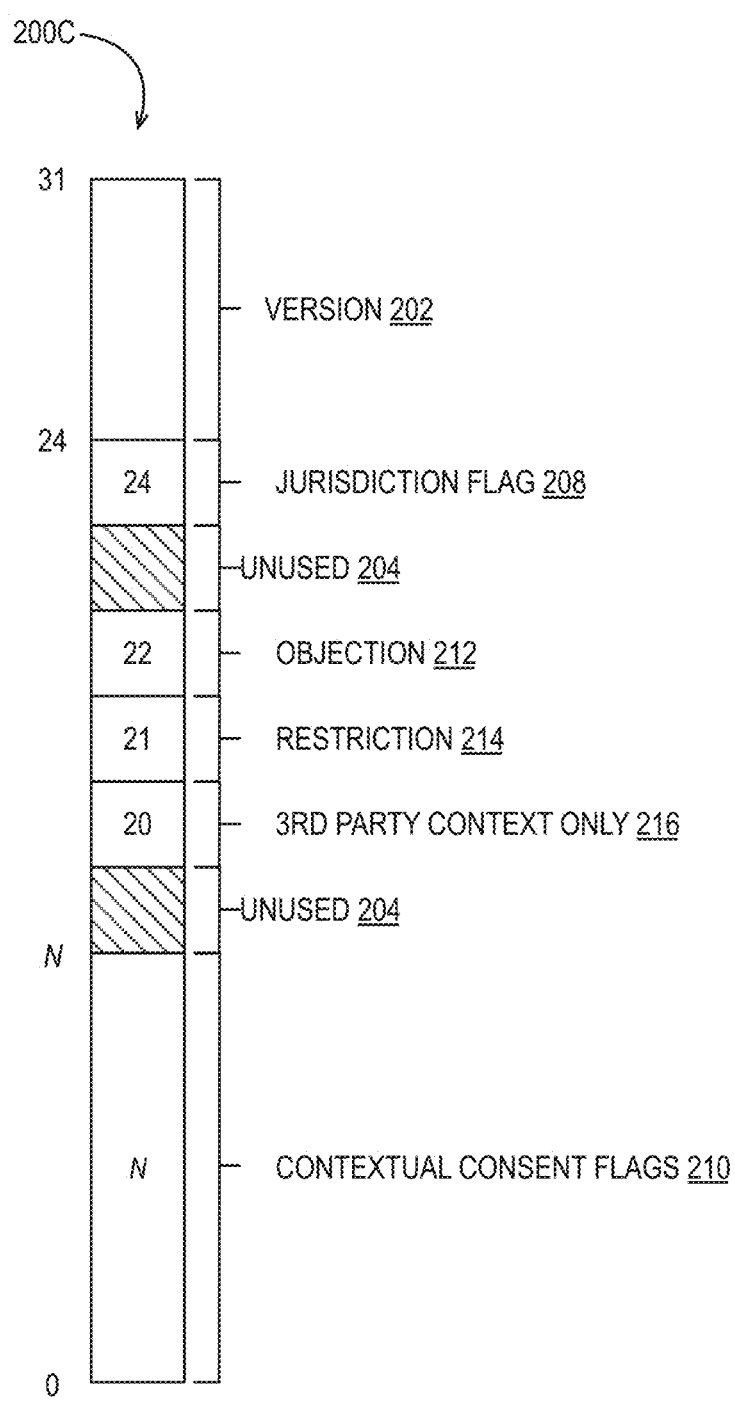

FIGS. 2A-2C are diagrams illustrating exemplary RCC field layouts according to some embodiments of the disclosure.

FIG. 2A illustrates an exemplary central opt-out RCC. In this embodiment, the RCC (200A) defines a user's preferences for how certain types of data can be used. As illustrated, the RCC (200A) includes a version field (202). This field specifies the version of the RCC field layout used and can remain a constant size across versions. For example, RCC (200A) may use the value "0x0" to represent the RCC (200A) is version zero, "0x1" to represent version 1, etc. Downstream devices use the version information to extract specific consent information from the RCC into a unified structure that applies to all versions. The RCC (200A) includes a plurality of unused bits (204). These unused bits are retained to allow for future expansion of the number of bit fields in the RCC.

Bits 4 through 0 of the RCC (200A) defines the user's consent parameters. The bits are set to one if the user opts out of the associate personalization and zero if the user does not opt-out. Alternatively, the converse can be used (zero can indicate opt-out while one indicates the user does not opt-out). Bit 4 (206A) is associated with first-party ad personalization. In one embodiment, first-party ad personalization refers to the ability of first-party devices (i.e., devices of the system that controls the user data) to personalize advertisements to a user of the system. Bit 3 (206B) is associated with third-party ad personalization. In one embodiment, third-party personalization refers to the ability of third-party entities (e.g., advertisers) to customize ads based on user data controlled by the first-party system (i.e., sharing of user data). Bit 2 (206C) is associated with content personalization. In one embodiment, content personalization refers to the customization of content (e.g., video, image, textual, etc.) transmitted to users using personal data. Bit 1 (206D) is associated with search assist personalization. In one embodiment, search assist personalization refers to the ability of a processing device to customize search results for a user when using their personal data. Bit 0 (206E) is associated with precise location history. In one embodiment, precise location history refers to the ability of processing devices to personalize content, advertisements, or other data, based on the location of the user (beyond a mere broad geographic descriptor). Examples of precise data include the current latitude and longitude of the user.

FIG. 2B illustrates an alternative RCC. In the illustrated embodiment, the RCC (200B) includes a version field (202) and unused data bits (204). These fields have been described previously and that disclosure is incorporated by reference in its entirety. In the illustrated embodiment, the number of unused data bits (204) is configured to occupy the remaining space between the contextual consent/opt-out flags (210) and the jurisdictional flag (208).

In the illustrated embodiment, the jurisdictional flag (208) can indicate what jurisdiction governs the RCC (200B). For example, in the illustrated embodiment, the jurisdictional flag can indicate whether the RCC (200B) is governed by European Union (EU) law or not. In alternative embodiments, the jurisdictional flag (208) can comprise multiple bits indicating the actual regulatory scheme governing the RCC (200B).

The contextual consent/opt-out flags (210) vary depending on the version of the RCC and the value of the jurisdictional flag (208).

In one embodiment, if the jurisdictional flag (208) indicates the RCC (200B) is governed by EU law, the contextual consent/opt-out flags (210) can comprise seven positive permission bits. Positive permission bits comprise bits that are set to one if the user allows the use of the data associated with a given bit. In one embodiment, the EU-specific positive position bits comprise permissions for access to a user's search history, account matching, cross-device mapping, precise geo-location access, analysis of the user's communications, use of the first-party as a third-party, core EU consent, first-party ad personalization, and content personalization. If any of these bits are set to one, the RCC (200B) represents a grant of consent for the associated bit in the EU. Alternatively, if the jurisdictional flag (208) is not set to EU, the contextual consent/opt-out flags (210) can comprise five bits of negative permission bits. Negative permission bits comprise bits that, when set to one, indicate a user has opted out of an associated use of user data. In one embodiment, the five, contextual consent/opt-out flags (210) comprise use of the user's precise location history, search assist personalization, content personalization, third-party ad personalization, and first-party ad personalization, as discussed above.

FIG. 2C illustrates an alternative RCC layout according to one embodiment of the disclosure. Various features of the RCC (200C) are described more fully in the description of FIG. 2B and that description is incorporated herein by reference in its entirety.

In the illustrated embodiment, the RCC (200C) includes additional bits for objections (212), restrictions (214), and third-party context only (216). In one embodiment, an objection instructs the system to deny processing under specified circumstances including use for direct marketing, research or statistical purposes, or other public or legitimate interests. Notably, an objection signals to downstream devices that the processing can only occur if the processing is necessary for the performance of a task carried out in the public interest or if the processing device can demonstrate it has compelling legitimate interest to process the data that override the data subject's rights and freedoms. Otherwise, the objection serves as an opt-out bit for any usages of the data not meeting these conditions.

A restriction refers to the instruction that any data associated with the RCC remain stored without being further processed. Finally, the third-party context only bit is set to one if the consent flags (210) refer to consent for third-parties only and are not related to first-party consent data.

Returning to FIG. 1, profile proxy (104) receives RCCs ($rcc_{stored}$ and $rcc_{each}$) from real-time data sources and the content repository (102) and builds a blended RCC ($rcc_{final}$) based on the input RCCs. As illustrated in FIGS. 2A-2C, this blended RCC can be generated by comparing the bits of the received RCCs with, optionally, pre-processing to synchronize the RCCs.

In one embodiment, the received RCCs can comprise RCCs having the same version. In this scenario, the profile proxy (104) confirms that the version string is the same for each RCC and ORs the bit fields to obtain the blended RCC. Alternatively, the received RCCs can comprise different versions of the RCC format. In this scenario, the profile proxy (104) can resolve the bit locations of a field in one RCC with the corresponding bit locations in the other version. If one of the received RCCs includes a field while the other does not, the method can use the existing field as the sole indication of a user's consent.

The profile proxy (104) forwards the blended RCC to data arbiter (110). Data arbiter (110) receives a regulatory query context (RQC) from one or more data requestors (112). In one embodiment, a data requestor comprises a third-party computing system requesting access to user data processed by system (100). Alternatively, or in conjunction with the foregoing, a data request can comprise a first-party subsystem of the system (100) requesting access to user data. As one example, the system (100) can comprise an ad exchange and the data requestors can comprise programmatic advertising systems responding to bid requests issued by the system upon receiving a real-time record that a user has visited a page containing an available ad slot.

In some embodiments, the RQC is supplied programmatically while in other scenarios the RQC can be selected by the data arbiter (110) based on the context the arbiter is processing the RCC. For example, the data arbiter (110) can use a specific RQC when determining whether to transmit contextually relevant news stories to a user and another specific RQC when determining whether to analyze a user's email when building a profile.

In one embodiment, the RQC comprises a plurality of fields including a jurisdiction governing the potential use of data (e.g., EU or rest-of-world (ROW)), a title of law field (e.g., EU General Data Protection Regulation (GDPR), Internet Advertising Bureau (IAB) standards), contractual relationship (e.g., first- or third-party), activity basis, algorithm, or data usage.

In the above description, activity basis refers to a type of processing that will be performed by the downstream processing. For example, the activity can be classified as a legitimate interest (LI) (e.g., analytics), rights-covered activity operating on non-profile data (RC) (e.g., cookie syncing), ad selection delivery and reporting (ASDR) reading a profile that already exists, content selection delivery and reporting (CSDR) reading a profile that already exists, and informing a profile (IP) (i.e., writing or modifying a user profile).

The algorithm field can include an identification of an algorithm, or algorithms, used such as linking (LINK), matching (MATCH), personalized advertising (P11A), or personalized content selection (P11C). The data usage field can store one or more types of data used by the RQC such as geographic data (GEO), communications data (COMINT), or search history data (SEARCH).

After receiving the blended RCC and RQC, the data arbiter (110) compares the requested permissions of the RQC with the blended RCC and determines whether to continue with the processing of the user data represented by the blended RCC. Descriptions of this determination are described more fully herein and are not repeated herein for the sake of clarity, but are incorporated by reference in their entirety.

In some embodiments, if the data arbiter (110) determines that the user data cannot be processed, data arbiter (110) ignores the request for processing user data in the records. In alternative embodiments, the data arbiter (110) can strip any personal or user data from the records and provide the remaining, non-user data to the data requestor for processing.

Alternatively, if the data arbiter (110) determines that the combination of RQC and final RCC allows for processing at least a portion (or all) of the user data, the data arbiter (110) generates a residual RCC. This residual RCC is created by combining the RQC and RCC (as described above and herein) to generate a synthetic RCC that describes the results of the decision process described above. Given the number of potential combinations of RCC bit fields and RQC bit fields, the resulting intersections (i.e., residual RCCs) are stored in content repository (102) for future processing. In this manner, the residual RCCs are cached in the content repository for later reuse.

In addition to caching the residual RCC, the data arbiter (110) forwards the records that can be processed to a downstream processor (114). As described above, the records transmitted to downstream processor (114) can comprise the records received by the profile proxy (104) or can comprise a segment of those records.

In one embodiment, the downstream processor (114) can perform any desired function on the returned records such as, but not limited to, programmatic advertisement selection and delivery, content selection and delivery, etc. In the illustrated embodiment, the downstream processor (114) is represented as part of the data platform. In alternative embodiments, the downstream processor (114) can comprise a processing element owned or operated by the data requestors (112).

Figure 3:
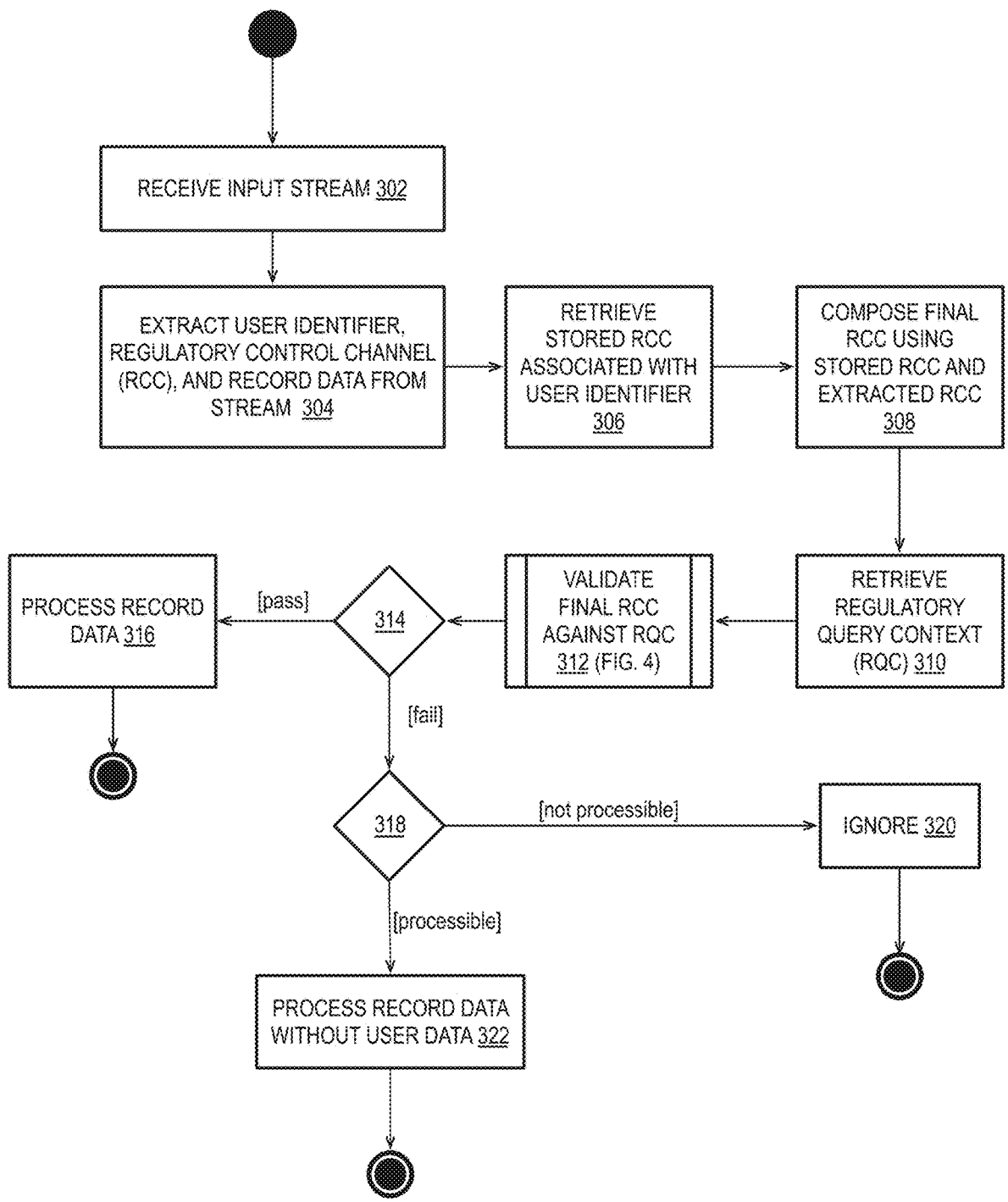
FIG. 3 is a flow diagram illustrating a method for processing user data according to some embodiments of the disclosure.

FIG. 3 is a flow diagram illustrating a method for processing user data according to some embodiments of the disclosure.

In step 302, the method receives an input stream and, in step 304, extracts a user identifier, RCC, and record data from the stream.

In one embodiment, an input stream can comprise real-time data received from client devices. Alternatively, or in conjunction with the foregoing, an input stream can comprise records of personal data received from third-parties (e.g., in a data trading system). Generally, the input stream includes a user identifier, consent data, and record data. The user identifier can comprise an alphanumeric code identifying a user or can comprise a unique identifier (e.g., a globally unique identifier) representing the user. In some embodiments, the user identifier comprises an email address, name, or other representation identifying the user. The consent data comprises an RCC string. As described above, the RCC string comprises a fixed length bit string conforming to a predefined RCC protocol. Record data comprises data to be processed and no limitation is placed on the form of the data. As one example, the data can comprise the location of the device transmitting the record or demographic data of the user of the client device. In general, the record can include personal data of a user as well as non-personal data. In one embodiment, user identifiers, consent data, and record data can be represented as a tuple (user$_{each}$, rcc$_{each}$, record$_{each}$).

The specific form of the input stream is not intended to be limiting. In one embodiment, each tuple can be combined into a binary object according to a defined field layout scheme. For example, the first eight bytes can comprise the user identifier, the following four bytes comprise the RCC, and the remaining bytes (until a null byte) comprise the record data. In other embodiments, protocol buffers can be used and a message embodying the user, RCC, and record data can be created and compiled into a message. An exemplary protocol buffer format is described below:

```
message UserData {
    required string userId;
    required int32 rcc;
    required bytes record;
}
```

As illustrated above, the RCC data can be represented as a 32-bit integer, to be unpacked into its binary representation during decoding. Thus, the above input stream can compactly represent complex permissions in four bytes (versus significantly more when using JSON to encode such permissions). Indeed, the overhead of encoding the minimally required JSON characters (seven) for a valid object ("{" ":""}") is larger than the size of the 32-bit RCC above.

In some embodiments, the input stream does delineate between individual messages. Thus, the method further (in step 304) extracts messages from the stream. In other words, the input stream can comprise a binary stream of bytes and the method accumulates bytes until reaching a delimiting byte (e.g., a null byte).

In step 306, the method retrieves a stored RCC using the user identifier.

As described above, users can express their preferences regarding consent to processing data via, for example, a user interface allowing users to set their preferences regarding specific types of data usage. These preferences are then stored within a user profile or database. In one embodiment, the preferences can also be encoded after being set while in other embodiments, the preferences can be encoded during step 306. Ultimately, the user's explicit preferences are encoded into RCC format (referred to as rcc$_{stored}$) and retrieved using the user ID.

It should be noted that the differences between rcc$_{stored}$ and rcc$_{each}$ are due to the nature in which the data is received. Clearly, rcc$_{stored}$ represents an explicit statement of consent from the user recorded in the database. The value of rcc$_{each}$ can be generated in a variety of ways. In one embodiment, rcc$_{each}$ can be programmatically generated based on an action resulting in the record. For example, an American user can visit a webpage while traveling in the European Union. This rcc$_{stored}$ user's would not contain, for example, an EU jurisdictional flag as the user is not European and is not normally located in the EU. However, an RCC generated when the user is visiting Europe would include an EU jurisdictional flag since the request is made from within the EU. This flag would be set by the browser or mobile device using the user's geo-location (e.g., latitude and longitude). As an aside, the geo-location can be included as part of the record data. In addition, the foregoing, the value of rcc$_{each}$ in the previous example can additionally set a default bit string representing proper processing under local law and this bit string is likely different from the American user's bit string representing their consent under "rest of world" (ROW) law.

In step 308, the method composes a final RCC (rcc$_{final}$ using the stored RCC (rcc$_{stored}$ and the input stream RCC (rcc$_{each}$.

In one embodiment, the stored RCC and input stream RCC comprise RCCs encoded using the same RCC encoding version. In this embodiment, the method can OR the two RCCs to obtain the final RCC. In alternative embodiments, the RCCs can have different fields due to the RCCs being encoded using different RCC versions. In this embodiment, the method can employ specific rules for translating, or supplementing, one RCC version with another. In one embodiment, the method can first apply any objection or restriction fields present in either RCC to the final RCC. The method can then determine if the jurisdictions of the RCCs match. If so, the method can combine the permissions of each RCC into a final RCC set (which can entail extending an early version consent bit string with additional consent bits from a later version bit string). In one embodiment, if the jurisdictions differ, the method can select the consent bits having the most restriction on the transfer of data. For example, if an EU consent bit indicates consent for first-party ad personalization and a ROW consent bit indicate opting out of first-party ad personalization, the method can set the final RCC consent bit as opting out of first-party ad personalization. In other embodiments, the method can give priority to the jurisdictional RCC represented in the input stream RCC.

In step 310, the method receives an RQC.

As described above, in one embodiment, the RQC comprises a plurality of fields including a jurisdiction governing the potential use of data (e.g., EU or ROW), a title of law field (e.g., EU GDPR, IAB standards), contractual relationship (e.g., first- or third-party), activity basis, algorithm, or data usage. Details of these fields are described above and are not repeated herein.

In one embodiment, the method receives the RQC from a third party. For example, the input stream can comprise page views of publisher web pages containing ad slots. The RQC in this example can be received as part of a response to a bid request to fulfill the ad slots by an advertiser. In some embodiments, the third-party provides the RQC themselves while in other embodiments, the RQC is cached by the method and associated with the third-party.

Alternatively, or in conjunction with the foregoing, the RQC can be stored locally and retrieved by the method based on the context of the received input stream. In this embodiment, the RQC is associated with the same entity executing the method. For example, the input stream can comprise a web view of a news dashboard. The RQC can represent the first-party provider's request to personalize news items for display based on the user's location and/or search history. Here, a single actor generates the input stream and supplies the RQC.

In step 312, the method validates the final RCC against the RQC. Details of this step are provided more fully in FIG. 4 and are only briefly summarized here.

In one embodiment, the method first determines if an objection or restriction flag in the final RCC is present and if so acts on this flag prior to analyzing the consent. Acting on the flag comprises analyzing the RQC to identify the type of processing activity requested and determining whether the presence of an objection/rejection flag results in failing the request.

After this initial filter, the method branches on the jurisdiction identified in the RCC. Next, the method identifies whether the RQC is associated with a first-party (i.e., the operator of the method) or a third-party. Depending on this determination, the method then proceeds to apply one or more Boolean rules using the RCC and RQC based on the jurisdiction and the first/third-party identifier.

The result of the above processing is a pass or fail signal that is provided back to the method.

In one embodiment, the method additionally generates a residual RCC based on the processing performed in step 312. In one embodiment, the residual RCC can be created by comparing the user's expressed consent (represented by the final RCC) and the RQC. In some embodiments, the resulting comparison will result in a residual RCC that describes consent determinations not present in the final RCC. For example, an American user can have both a ROW consent bit allowing first-party advertisements and an EU consent bit disallowing first-party advertising. If the user creates and manages their account in the US, they would not be associated with an EU consent bit. However, continuing the above example, if the American user requests data from within the EU, the final RCC would include the RCC generated from the input stream and the resulting residual RCC would include only those parameters relevant to the EU used in determining whether to act.

In another embodiment, the residual RCC can comprise the RCC fields specific to the requested action. For example, the final RCC can comprise a plurality of consent bits but only a subset of these consent bits is relevant to the RQC. For example, the final RCC can include both first- and third-party ad selection and delivery consent bits, but the RQC may only comprise a first-party ad selection request. In this embodiment, the method filters the final RCC only to include the consent bits relevant to the RQC. As described below, the method can store this residual RCC along with the processing result to create an audit trail of what consent was used for the processing.

In step 314, the method receives an acts on this signal.

If the signal is a pass signal, the data requestor issuing the RQC can process the record data included within the input stream. In this scenario, the method passes the record through to the downstream processing (step 316).

The downstream processing can comprise any type of downstream processing. Generally, downstream processing comprises first-party processing or third-party processing. First-party processing refers to processing performed by the operator of the method either in response to a third-party request or independently. Processing in response to a third-party request can comprise processing such as advertisement insertion or data trading. Processing in response to a first-party request can comprise any type of processing the first-party (i.e., the operator of the method) desires to perform using user data (e.g., content recommendation, search assistance, etc.). Generally, the downstream processing comprises any processing identified in the RQC (as described previously).

Third-party processing refers to processing performed outside of the control of the operator of the method illustrated in FIG. 3. For example, in a data trading operation, the RQC may identify a processing of content delivery and reporting and this processing is to occur by the data requestor associated with the RQC. In this embodiment, the processing in step 316 is performed "off-site" and the method can transmit the relevant record data to the data requestor upon validating the request in step 312. In some embodiments, the data requestor can employ the method described in FIG. 3 prior to performing the processing. In this embodiment, the final or residual RCC is transmitted to the data requestor to enable further comparison.

In some embodiments, the method can store the user identifier, residual RCC, and the results of processing in a database for future analysis. For example, the method can store the residual RCC which represents the permissions for a given transaction as well as the results of the processing to create an audit trail of how a user's data has been processed. This audit trail can also be used to represent the compliance of the method operator with privacy laws and regulations.

In the alternative, the method determines that the result of step 312 is a failing result, this means the RQC does not have authority to use the data based on the consent granted (or opt-outs selected) in the final RCC. In this case the method proceeds to step 318.

In step 318, the method determines if the processing requested in the RQC is still processible. In one embodiment, a processing associated with the RQC can still be processible if it can be fulfilled without user data. Alternatively, or in conjunction with the foregoing, a processing can be processible if the request specifies an override of the validation. An override can comprise a flag within the RQC expressing that the processing has a legitimate interest in utilizing the user data or is performing a public service using the user data, among other overrides.

If the method determines that the processing in the RQC is not processible the method ignores the RQC (step 320). In some embodiments, the method can return an error code to the data requestor specifying that the request has been ignored and, optionally, providing an explanation for why the request was ignored.

If the method determines that the processing in the RQC is processible, the method processes the record data without the user data (step 322). This processing is nearly identical to the process described in step 316. However, in step 322, the processing does not utilize the user data when performing the downstream processing.

Figure 4:
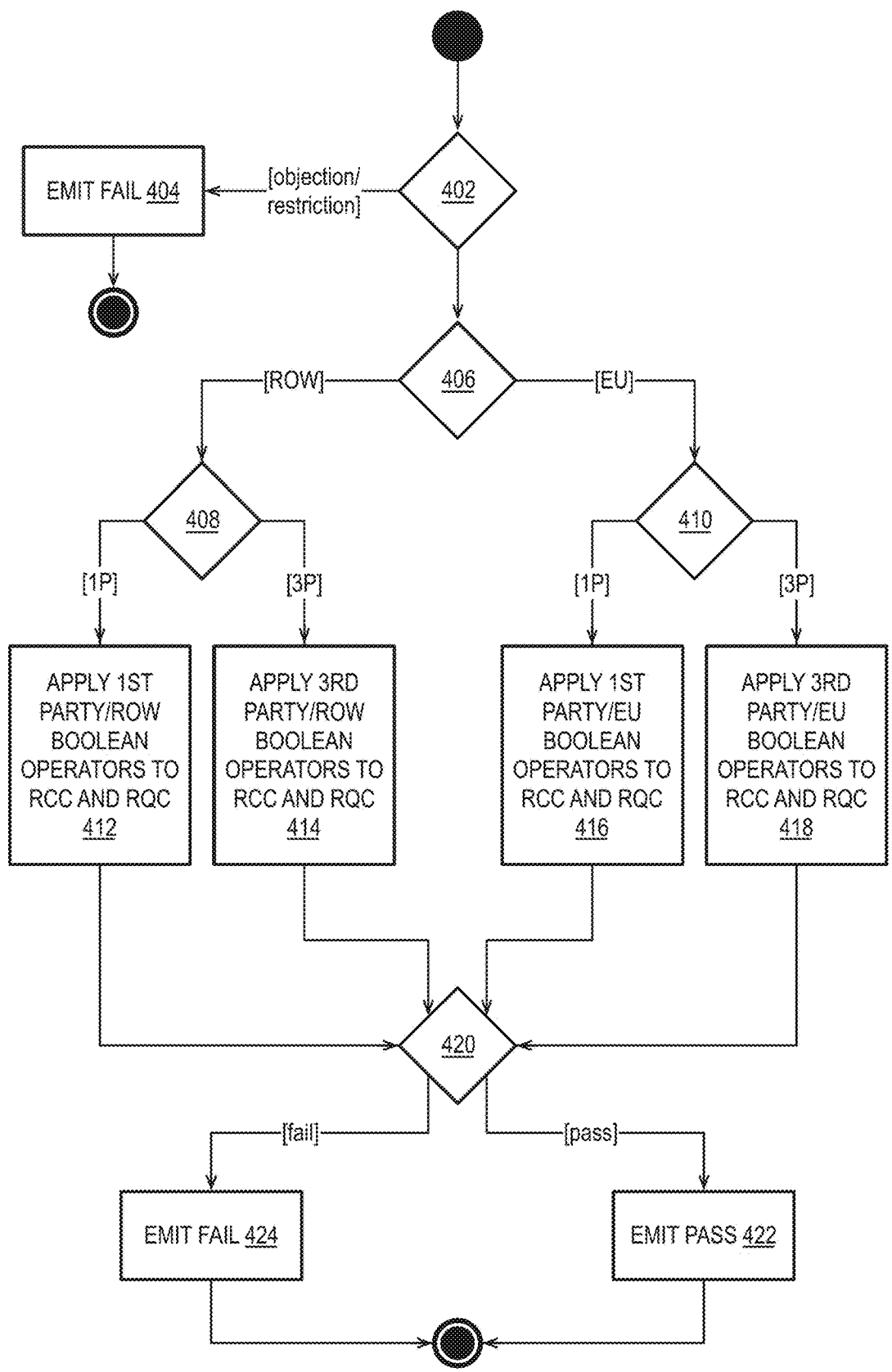
FIG. 4 is a flow diagram illustrating a method for formulating a decision regarding further processing of personal data according to some embodiments of the disclosure.

FIG. 4 is a flow diagram illustrating a method for formulating a decision regarding further processing of personal data according to some embodiments of the disclosure.

In step 402, the method determines whether an objection or restriction flag has been set.

As described above, an objection or restriction flag overrides consent bits in the RCC for specific types of processing. Thus, in step 402, the presence of an objection or restriction flag halts all processing and the method emits a failing result in step 404.

In some embodiments, part of step 402 can be optional. For example, the method illustrated in FIG. 4 can be applied when the requested RQC processing is ad selection and delivery, where objections and restrictions (under the GDPR) prevent the use of personal data. Alternatively, if the RQC specifies that it has a legitimate interest in the user data (under the GDPR), this flag in the RQC overrides the objection and thus bypasses step 402. Thus, as compared to the objection for ad selection (which is absolute), other types of processing can override step 402 if they indicate a legitimate interest in the data.

In some embodiments, while objection flags can be ignored or overridden, a restriction flag will always trigger the method to emit a failure. In this embodiment, the restriction indicates that the user attempted to erase all user data but the system maintained the data in a restricted state rather than erasing the data. Such scenarios generally occur when erasure of the data may frustrate law enforcement or other activities where the data can still be accessed by authorized third parties.

In step 406, the method identifies the jurisdiction associated with the RCC and RQC. As described above, this can be identified based on the jurisdictional flags in the RCC as well as the RQC. In some embodiments, if the RCC and RQC jurisdictions conflict, the method utilizes the RQC jurisdiction. Alternatively, the method can order all possible jurisdictions by the severity of privacy restrictions and use this table to select the jurisdiction having the most robust privacy regulations (e.g., the EU).

After identifying the jurisdiction, the method determines whether the RQC is received from a first-party or third-party (steps 408 and 410). In one embodiment, steps 408 and 410 can be performed using the same logic. In one embodiment, this logic comprises analyzing the RQC to determine if the RQC specifies first- or third-party. Alternatively, the method can identify the type of party based on where the RQC was transmitted from.

After identifying the jurisdiction and party identifier, the method applies the appropriate Boolean operators to the RCC and RQC based on these identifiers (steps 412-418). In the illustrated embodiment, the Boolean operators differ among steps but the application of the operators are identical. In one embodiment, the jurisdiction, party identifier, and processing type (e.g., ASDR, CSDR, etc.) are used to load the defined Boolean operators to apply.

The following example describes the operations of the above steps in the context of a request for ASDR processing.

In step 412, the jurisdiction is ROW and the party is first-party. In this step, the retrieved processing rules can specify a failure if the user opts-out of personalized advertising (see FIG. 2A, element 206A). This can be represented as the rule !P11A, the Boolean NOT of a first-party consent bit. If the user opts-out of personalized advertising (i.e., P11A==1), the Boolean operator results in a zero result; otherwise the result is !0, or, 1.

In step 414, the jurisdiction is ROW and the party is third-party. In this step, the retrieved processing rules can specify a failure if the user opts-out of third-party advertising personalization (see FIG. 2A, element 206B). This can be represented as the rule !O3P, the Boolean NOT of a third-party advertising opt-out bit. If the user opts-out of third-party personalized advertising (i.e., O3P==1), the Boolean operator results in a zero result; otherwise the result is !0, or, 1.

In step 416, the jurisdiction is EU and the party is third-party. In this step, the retrieved processing rules can specify a success if the user does not opt-out of personalized advertising (see FIG. 2A, element 206A) and the RQC specifies a core of consent to the downstream processing activity. This can be represented as the rule CORE && !P11A, the Boolean NOT of a first-party consent bit AND a core of consent flag in the RQC. If the user opts-out of personalized advertising (i.e., P11A==1) or a core of consent flag is set to 0, the Boolean operator results in a zero result; otherwise the result is 1.

In step 418, the jurisdiction is EU, and the party is third-party. In this step, the retrieved processing rules can specify a success if the user does not opt-out of third-party advertising personalization (see FIG. 2A, element 206B) and either a core of consent (CORE) is present, or an IAB standard advertisement is specified. This can be represented as the rule (CORE||IAB SA) && !O3P. If the user opts-out of third-party personalized advertising (i.e., O3P==1) or the RQC does not specify either CORE or IAB SA advertising, the Boolean operator results in a zero result; otherwise the result is 1.

The above examples are not intended to be limiting, and the specific rules for processing each permutation of processing type, jurisdiction, and party type are not enumerated here.

In step 420, the method analyzes the result of the aforementioned Boolean operators in steps 412-418. If the returned result is zero, the method emits a fail (step 424) as described above. Alternatively, if the return result is non-zero (e.g., one), the method emits a pass signal (step 422). These signals are then used to control the transmission of user data, as described in FIG. 3.

Figure 5:
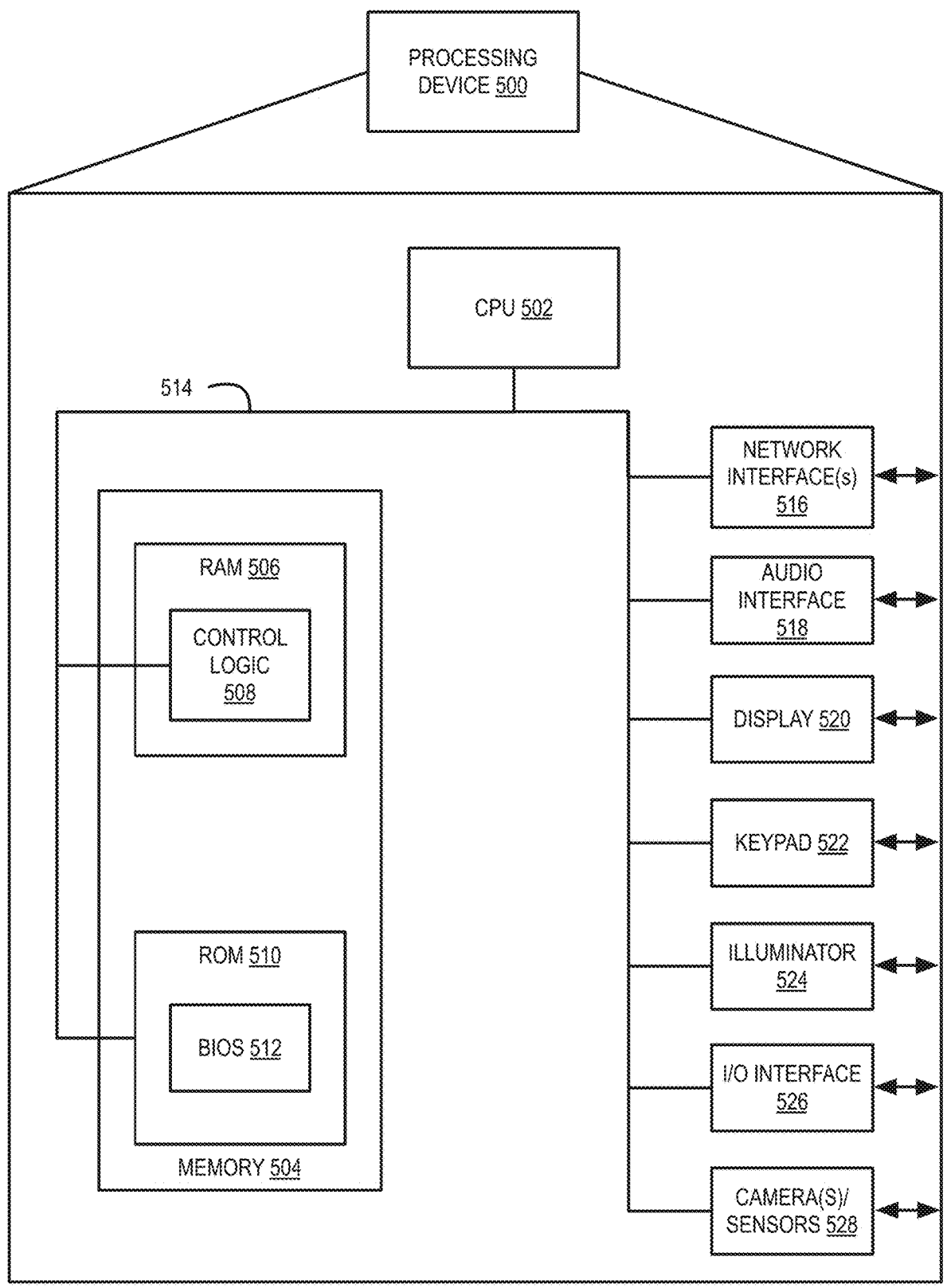
FIG. 5 is a block diagram illustrating a processing device for implementing programmatic control of user data according to some embodiments of the disclosure.

FIG. 5 is a block diagram illustrating a processing device for implementing programmatic control of user data according to some embodiments of the disclosure.

The processing device can include many more or fewer components than those shown in FIG. 5. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 5 can be implemented as a virtual machine while in other embodiments the device can be implemented as a physical machine. In some embodiments, the device is implemented as both, with a virtual machine running on the device depicted in FIG. 5.

As shown in FIG. 5, processing device (500) includes processing units (CPUs) (502) in communication with a mass memory (504) via a bus (514). Processing device (500) also includes one or more network interfaces (516), an audio interface (518), a display (520), a keypad (522), an illuminator (524), an input/output interface (526), and a camera(s) or other optical, thermal or electromagnetic sensors (528). Processing device (500) can include one camera/sensor (528), or a plurality of cameras/sensors (528), as understood by those of skill in the art.

Processing device (500) can optionally communicate with a base station (not shown), or directly with another computing device. Network interface (516) includes circuitry for coupling processing device (500) to one or more networks and is constructed for use with one or more communication protocols and technologies. Network interface (516) is sometimes known as a transceiver, transceiving device, or network interface card (NIC).

Audio interface (518) is arranged to produce and receive audio signals such as the sound of a human voice. For example, audio interface (518) can be coupled to a speaker and microphone (not shown) to enable telecommunication with others and generate an audio acknowledgment for some action. Display (520) can be a liquid crystal display (LCD), gas plasma, light emitting diode (LED), or any other type of display used with a computing device. Display (520) can also include a touch sensitive screen arranged to receive input from an object such as a stylus or a digit from a human hand.

Keypad (522) can comprise any input device arranged to receive input from a user. For example, keypad (522) can include a push button numeric dial, or a keyboard. Keypad (522) can also include command buttons that are associated with selecting and sending images. Illuminator (524) can provide a status indication and provide light. Illuminator (524) can remain active for specific periods of time or in response to events. For example, when illuminator (524) is active, it can backlight the buttons on keypad (522) and stay on while the processing device (500) is powered. Also, illuminator (524) can backlight these buttons in various patterns when actions are performed, such as dialing another processing device. Illuminator (524) can also cause light sources positioned within a transparent or translucent case of the processing device (500) to illuminate in response to actions.

Processing device (500) also comprises input/output interface (526) for communicating with external devices not shown in FIG. 6. Input/output interface (526) can utilize one or more communication technologies, such as USB, infrared, Bluetooth™, or the like.

Mass memory (504) includes a RAM (506), a ROM (510), and other storage means. Mass memory (504) illustrates another example of computer storage media for storage of information such as computer-readable instructions, data structures, program modules or other data. Mass memory (504) stores a basic input/output system ("BIOS") (512) for controlling low-level operation of processing device (500). The mass memory can also store an operating system for controlling the operation of processing device (500). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs.

Memory (504) includes control logic (508). As described above, the control logic (508) can comprise rules and or Boolean logic for processing RCC and RQCs received via network interfaces (516) as described above. The control logic (508) can also include program code for performing any and all of methods described in connection with FIGS. 3 through 4.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a non-transitory computer readable medium (or computer-readable storage medium/media) stores computer data, which data can include computer program code (or computer-executable instructions) that is executable in machine-readable form. By way of non-limiting example, a computer readable medium can comprise computer-readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more computing devices, client devices, servers, or be loaded and executed by one or more of such devices. One or more modules can be grouped into an engine or an application.

Those skilled in the art will recognize that the disclosed methods and systems can be implemented in many manners and are not limited by the foregoing exemplary embodiments and examples. Functional elements being performed by single or multiple components, in various combinations of hardware and software or firmware, and individual functions, can be distributed at the client, server or cloud level, or at all levels. In this regard, any of the features described herein can be combined into single or multiple embodiments, and alternate embodiments having fewer than, or more than, all of the features described herein are possible.

The embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Functionality can also be, in whole or in part, distributed among multiple components, in manners now known or to become known. Thus, myriad software/hardware/firmware combinations are possible in achieving the functions, features, interfaces and preferences described herein. The scope of the present disclosure covers known manners for carrying out the described unconventional features and functions and interfaces, as well as those variations and modifications that can be made to the hardware or software or firmware components described herein as would be understood by those skilled in the art now and hereafter. Thus, while various embodiments have been described for purposes of this disclosure, such embodiments should not be deemed to limit the teaching of this disclosure to those embodiments. Various changes and modifications can be made to the elements and operations described herein to obtain a result that remains within the scope of the systems and processes described in this disclosure.

What is claimed is:

1. A method comprising:
   receiving, by a processor, an input stream of data, the data including user data and a first regulatory control channel (RCC) data structure;
   building, by the processor, a final RCC data structure based on the first RCC data structure and a stored RCC data structure, the final RCC data structure comprising a bit string representing user consent for processing the user data;
   retrieving, by the processor, a regulatory query context (RQC) from a data requestor, the RQC comprising a second bit string representing a type of downstream processing request of the data requestor;
   applying, by the processor, one or more Boolean operators to the final RCC data structure and the RQC to obtain an evaluation result, the Boolean operators being applied to individual bits of the bit string of the final RCC and second bit string of the RQC; and
   executing, by the processor, the downstream processing if the evaluation result comprises a passing evaluation result.

2. The method of claim 1, the data in the input stream of data further comprising a user identifier; and the building a final RCC data structure further comprising retrieving the stored RCC data structure from a content repository, the content repository storing explicit user consent data.

3. The method of claim 1, the building a final RCC data structure comprising generating, by the processor, a fixed-length binary bit string, a least a portion of the fixed-length binary bit string comprising a series of bits representing user consent to discrete types of processing.

4. The method of claim 1, the building a final RCC data structure comprising including, by the processor, in the fixed-length binary bit string one or more of a version identifier, an objection flag, a restriction flag, and a jurisdiction flag.

5. The method of claim 1, the applying one or more Boolean operators comprising:
   setting, by the processor, the evaluation result as a failing result if the final RCC data structure includes a restriction flag;
   setting, by the processor, the evaluation result as a failing result if the final RCC data structure includes the objection flag and the RQC does not contain a field overriding the objection flag; and
   setting, by the processor, the evaluation result as a passing result if the final RCC data structure includes the objection flag and the RQC contains a field overriding the objection flag.

6. The method of claim 1, the applying one or more Boolean operators comprising identifying, by the processor, a jurisdiction based on the final RCC data structure and the RQC.

7. The method of claim 6, the applying one or more Boolean operators comprising identifying, by the processor, a party identifier of the RQC by extracting the party identifier from the RQC, the party identifier comprising an identifier selected from the group consisting of a first-party identifier and a third-party identifier.

8. The method of claim 7, the applying one or more Boolean operators comprising retrieving, by the processor, the one or more Boolean operators using the jurisdiction, the party identifier, and the type of downstream processing.

9. The method of claim 1, the retrieving the RQC comprising retrieving a data structure including a jurisdiction field, a title of law field, contractual relationship field, activity basis field, algorithm field, and data usage field.

10. The method of claim 1, further comprising: generating, by the processor, a residual RCC data structure based on the applying the one or more Boolean operators to the final RCC data structure and the RQC.

11. An apparatus comprising: a processor; and a non-transitory storage medium for tangibly storing thereon program logic for execution by the processor, the stored program logic comprising:
    logic, executed by the processor, for receiving an input stream of data, the data including user data and a first regulatory control channel (RCC) data structure;
    logic, executed by the processor, for building a final RCC data structure based on the first RCC data structure and a stored RCC data structure, the final RCC data structure comprising a bit string representing user consent for processing the user data;
    logic, executed by the processor, for retrieving a regulatory query context (RQC) from a data requestor, the RQC comprising a second bit string representing a type of downstream processing request of the data requestor;
    logic, executed by the processor, for applying one or more Boolean operators to the final RCC data structure and the RQC to obtain an evaluation result, the Boolean operators being applied to individual bits of the bit string of the final RCC and second bit string of the RQC; and
    logic, executed by the processor, for executing the downstream processing if the evaluation result comprises a passing evaluation result.

12. The apparatus of claim 11, the data in the input stream of data further comprising a user identifier; and the logic for building a final RCC data structure further comprising logic, executed by the processor, for retrieving the stored RCC data structure from a content repository, the content repository storing explicit user consent data.

13. The apparatus of claim 11, the logic for building a final RCC data structure comprising logic, executed by the processor, for generating a fixed-length binary bit string, a least a portion of the fixed-length binary bit string comprising a series of bits representing user consent to discrete types of processing.

14. The apparatus of claim 11, the logic for building a final RCC data structure comprising logic, executed by the processor, for including in the fixed-length binary bit string one or more of a version identifier, an objection flag, a restriction flag, and a jurisdiction flag.

15. The apparatus of claim 11, the logic for applying one or more Boolean operators comprising:
    logic, executed by the processor, for setting the evaluation result as a failing result if the final RCC data structure includes a restriction flag;
    logic, executed by the processor, for setting the evaluation result as a failing result if the final RCC data structure includes the objection flag and the RQC does not contain a field overriding the objection flag; and
    logic, executed by the processor, for setting the evaluation result as a passing result if the final RCC data structure includes the objection flag and the RQC contains a field overriding the objection flag.

16. The apparatus of claim 11, the logic for applying one or more Boolean operators comprising logic, executed by the processor, for identifying a jurisdiction based on the final RCC data structure and the RQC.

17. The apparatus of claim 16, the logic for applying one or more Boolean operators comprising logic, executed by the processor, for identifying a party identifier of the RQC by extracting the party identifier from the RQC, the party identifier comprising an identifier selected from the group consisting of a first-party identifier and a third-party identifier.

18. The apparatus of claim 17, the logic for applying one or more Boolean operators comprising logic, executed by the processor, for retrieving the one or more Boolean operators using the jurisdiction, the party identifier, and the type of downstream processing.

19. The apparatus of claim 11, the logic for retrieving the RQC comprising logic, executed by the processor, for retrieving a data structure including a jurisdiction field, a title of law field, contractual relationship field, activity basis field, algorithm field, and data usage field.

20. The apparatus of claim 1, the stored program logic further comprising: logic, executed by the processor, for generating a residual RCC data structure based on the applying the one or more Boolean operators to the final RCC data structure and the RQC.

\* \* \* \* \*